(12) United States Patent
Mandeville et al.

(10) Patent No.: US 10,046,799 B2
(45) Date of Patent: Aug. 14, 2018

(54) WALK BEHIND POWER EQUIPMENT WITH ZERO TURN CAPABILITY

(71) Applicant: HUSQVARNA AB, Huskvarna (SE)

(72) Inventors: Kenneth Mandeville, Weddington, NC (US); Andy Modzik, Mooresville, NC (US); Matt Lambert, Harrisburg, NC (US); Robert Fancher, Charlotte, NC (US); David Baker, Ft. Lawn, SC (US)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 15/513,423

(22) PCT Filed: Sep. 24, 2015

(86) PCT No.: PCT/IB2015/057357
§ 371 (c)(1),
(2) Date: Mar. 22, 2017

(87) PCT Pub. No.: WO2016/046783
PCT Pub. Date: Mar. 31, 2016

(65) Prior Publication Data
US 2017/0247052 A1 Aug. 31, 2017

Related U.S. Application Data

(60) Provisional application No. 62/056,025, filed on Sep. 26, 2014.

(51) Int. Cl.
*B62D 11/10* (2006.01)
*B62D 11/00* (2006.01)
*E01H 5/09* (2006.01)

(52) U.S. Cl.
CPC ............ *B62D 11/10* (2013.01); *B62D 11/006* (2013.01); *E01H 5/098* (2013.01)

(58) Field of Classification Search
CPC ........ B62D 11/10; B62D 11/006; E01H 5/098
See application file for complete search history.

(56) References Cited

U.S. PATENT DOCUMENTS

| 1,350,071 A | 8/1920 | Davies |
| 3,715,928 A | 2/1973 | Case et al. |

(Continued)

FOREIGN PATENT DOCUMENTS

| RU | 68450 U1 | 11/2007 |
| SU | 448981 A1 | 11/1974 |

OTHER PUBLICATIONS

International Search Report and Written Opinion of International Application No. PCT/IB2015/057357 dated Jan. 5, 2016, all enclosed pages cited.

(Continued)

*Primary Examiner* — Anne Marie M Boehler
*Assistant Examiner* — Felicia L. Brittman
(74) *Attorney, Agent, or Firm* — McNair Law Firm, P.A.

(57) ABSTRACT

A drive assembly (140) for a walk-behind, powered device operably couples an engine (110) of the powered device to a mobility assembly (120) to provide mobility of the powered device responsive at least in part to operation of the engine (110). The drive assembly (140) includes a transmission shaft and a mechanical power reversing assembly (150). The transmission shaft selectively receives first drive power or second drive power coupled from the engine (110) to drive a first drivable component (122) and a second drivable component (124) of the mobility assembly (120). The first and second drivable components (122, 124) are disposed substantially at opposing sides of the powered device. The mechanical power reversing assembly (150) is selectively engagable to convert the first drive power generated for the first drivable component (122) into the second (Continued)

drive power provided to the second drivable component (124) and vice versa.

18 Claims, 8 Drawing Sheets

(56) References Cited

U.S. PATENT DOCUMENTS

| | | | |
|---|---|---|---|
| 5,018,592 A * | 5/1991 | Buchdrucker | B62D 11/08 180/19.3 |
| 8,136,613 B2 | 3/2012 | Schaedler et al. | |
| 2003/0232682 A1* | 12/2003 | Rogers | B60K 17/046 475/221 |
| 2014/0109535 A1 | 4/2014 | Spitz et al. | |

OTHER PUBLICATIONS

Chapter I International Preliminary Report on Patentability for International Application No. PCT/IB2015/057357 dated Mar. 28, 2017, all enclosed pages cited.

* cited by examiner

WALK BEHIND POWER EQUIPMENT WITH ZERO TURN CAPABILITY

CROSS-REFERENCE TO RELATED APPLICATIONS

This application is an international application which claims priority to U.S. application No. 62/056,025 filed Sep. 26, 2014, and said application is expressly incorporated herein in its entirety.

TECHNICAL FIELD

Example embodiments generally relate to outdoor power equipment and, more particularly, relate to walk behind power equipment that can be provided with a zero turn capability.

BACKGROUND

Grounds care/yard maintenance and other outdoor tasks associated with grooming and maintaining property are commonly performed using various tools and/or machines that are configured for the performance of corresponding specific tasks. Certain tasks, like snow removal, are typically performed by snow removal equipment such as snow blowers or snow throwers. The snow removal equipment may, in some cases, be walk-behind models. However, snow blower or snow thrower attachments can sometimes be added to lawn tractors or other riding yard maintenance vehicles as well.

Walk behind snow blowers may be easier to operate and control with a mobility assembly that is powered. Thus, for example, power may be coupled from the engine to turn not only the impeller of the snow blower, but also power the wheels or tracks via which the snow blower moves. In some cases, a binary (on/off) application of power may be considered to be sufficient. However, some devices may be operated in locations where more control is desirable and where tight turns are needed. In such environments, a binary application of power is less useful.

BRIEF SUMMARY OF SOME EXAMPLES

Some example embodiments may therefore provide the ability to give operators a greater degree of control with respect to powered driving of the mobility assembly of a walk behind, powered device. In this regard, for example, some example embodiments may provide a zero turn or other tight turn radius capability for such devices. However, such capability may be provided via a mechanical solution that, for example, selectively converts drive power supplied to one side of the mobility assembly into reverse drive power provided to the other side to enable the device to be turned with a small turn radius.

In one example embodiment, a drive assembly for a walk-behind, powered device is provided. The drive assembly operably couples an engine of the powered device to a mobility assembly to provide mobility of the powered device responsive at least in part to operation of the engine. The drive assembly includes a transmission shaft and a mechanical power reversing assembly. The transmission shaft selectively receives first drive power or second drive power (in a direction opposite the first drive power) coupled from the engine to drive a first drivable component and a second drivable component of the mobility assembly. The first and second drivable components are disposed substantially at opposing sides of the powered device. The mechanical power reversing assembly is selectively engagable to convert the first drive power generated for the first drivable component into the second drive power provided to the second drivable component.

In another example embodiment, a walk-behind, powered device is provided. The powered device includes an engine, a mobility assembly operably coupled to the engine to provide mobility of the powered device responsive at least in part to operation of the engine, a working assembly operably coupled to the engine to perform a working function responsive at least in part to operation of the engine, and a drive assembly operably coupling the engine to the mobility assembly to selectively provide first drive power or second drive power to the mobility assembly. The mobility assembly includes a first drivable component and a second drivable component. The first and second drivable components may be disposed substantially at opposing sides of the powered device. The drive assembly is configured to selectively and independently provide power to the first and second drivable components. The drive assembly includes a mechanical power reversing assembly that is selectively engagable to convert the first drive power generated for the first drivable component into the second drive power provided to the second drivable component.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

For a snow blower, or other walk behind device for which powered mobility is desired, the device may be configured to enable selective coupling to one or more of the wheels of the device. To improve the turn radius of the device, the application of power to one wheel may be stopped while the application of power to the other wheel continues. The uneven application of power to the wheels may allow for a tighter turn. To enable even tighter turning, one might consider applying reverse power to one wheel while applying forward power to the other wheel, as is often done with zero turn riding lawn mowers. However, such mowers employ hydraulic power to each respective wheel in opposing directions and walk behind power equipment is often not large enough to support such additional power sources for each wheel. Accordingly, an example embodiment may be provided to selectively convert the forward drive power applied to one wheel into reverse drive power for the other wheel (or vice versa) using a mechanical solution. Thus, a mechanical conversion device may be implemented so that a single power source is usable to drive wheels (or other drivable components) in opposing directions when zero turn capability is desired.

Figure 1:
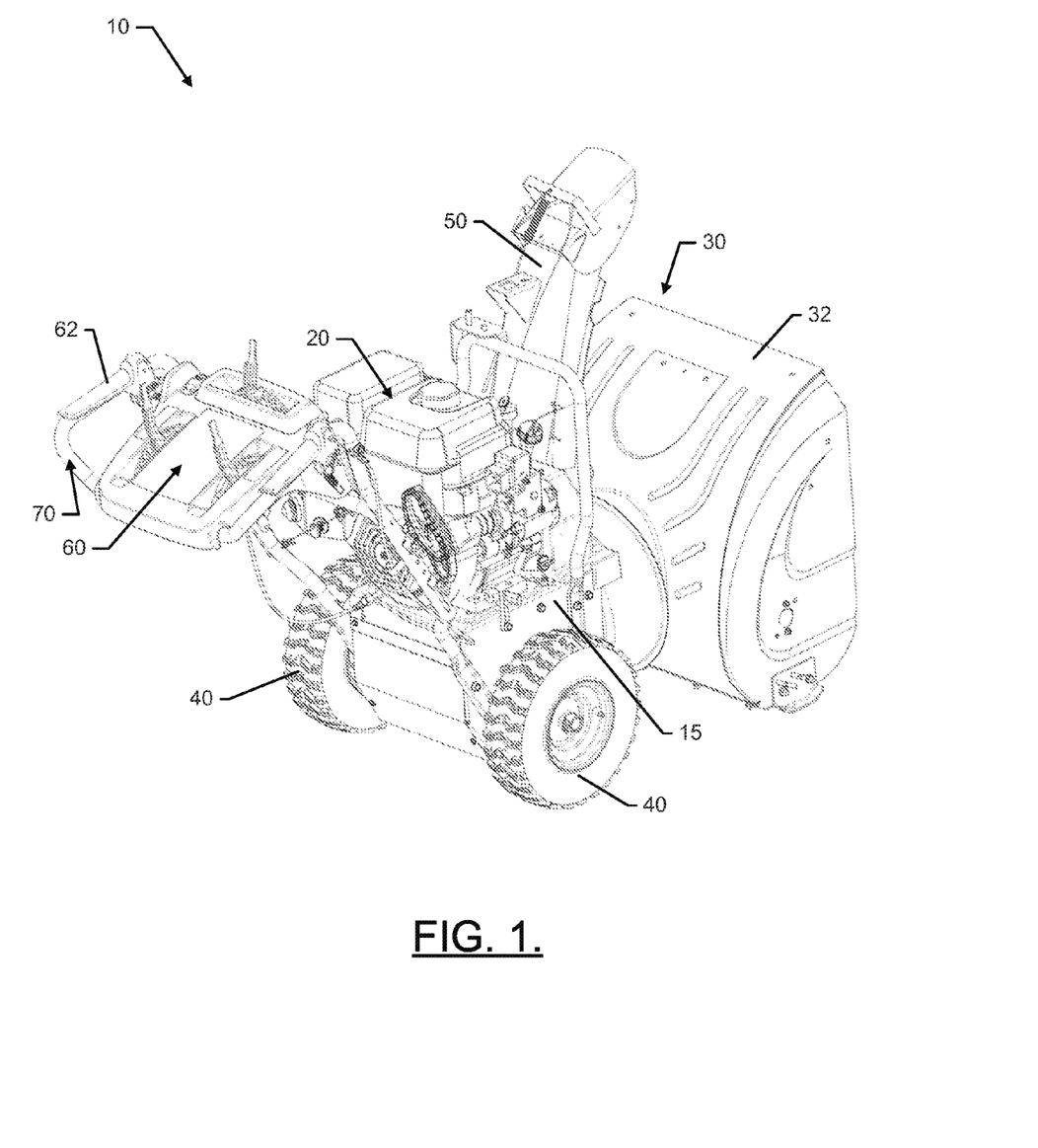
FIG. 1 illustrates a perspective view of a snow removal device according to an example embodiment.

FIG. 1 illustrates an example of a walk behind, powered device in the form of a snow removal device 10. Although the snow removal device 10 of FIG. 1 is shown as a walk-behind snow removal device (i.e., a snow blower or snow thrower), it should be appreciated that example embodiments could be employed in connection with other walk behind power equipment as well, such as tillers, mowers, edgers, and/or the like.

In some embodiments, the snow removal device 10 may include a chassis 15 or frame to which various components of the snow removal device 10 may be attached. For example, the chassis 15 may support an engine 20, such as a gasoline powered engine, and a working assembly 30. Operation of the engine 20 may be initiated by a recoil starter via pulling of a recoil starter handle by the operator. However, in other embodiments, the engine 20 may alternatively be started via a key, switch or other similar device.

The snow removal device 10 may include wheels 40 or continuous tracks forming a mobility assembly on which a substantial portion of the weight of the snow removal device 10 may rest, when the snow removal device 10 is stationary. The mobility assembly (e.g., the wheels 40 or continuous tracks) may also provide for mobility of the snow removal device 10. In some cases, the mobility assembly may be driven via power from the engine 20. However, in other cases, the mobility assembly may simply provide for mobility of the snow removal device 10 responsive to pushing by the operator. In other words, for example, the mobility assembly may be an active or passive provider of mobility for the snow removal device 10. As will be discussed below, in some embodiments, the mobility assembly may selectively provide forward and reverse power to each of the wheels 40 including the simultaneous provision of forward power to one wheel while providing reverse power to the other wheel using a mechanical reversing assembly. This feature may enhance turning capabilities and general control capabilities for the snow removal device 10.

In this example, the working assembly 30 is a dual stage snow thrower. As such, the working assembly 30 includes a rotatable auger (or auger blade) that is configured to work (e.g., spin, rotate, turn, and/or the like) in order to direct snow toward an impeller (or impeller blade) that also works (e.g., spins, rotates, turns, and/or the like) to direct snow toward a discharge path to be ejected from the snow removal device 10. However, it should be appreciated that the working assembly 30 of some embodiments could include a power brush or other implement used to move snow toward a second stage device (e.g., the impeller) for ejection from the working assembly 30. The working assembly 30 could also include a single stage auger or impeller or structures for performing another work function (e.g., a blade for mowing or edging, or a tine assembly for tilling). In an example embodiment, the working assembly 30 may be powered via operable coupling to the engine 20. The operable coupling of the working assembly 30 to the engine 20 may be selectively engaged and/or disengaged (e.g., via a clutch, one or more selectively engageable chains/belts/pulleys, a friction wheel or other similar devices). Components of the working assembly 30 (e.g., the auger and the impeller) may be housed in a bucket assembly 32.

As can be appreciated from FIG. 1, the bucket assembly 32 prevents escape of snow and directs the snow into the ejection path. Thus, the bucket assembly 32 also protects the operator from blowback and allows for a somewhat orderly disposal of the snow that is ejected by the snow removal device 10. The ejection path of the snow removal device 10 may be formed at least in part by the bucket assembly 32 and the discharge chute 50. As such, for example, the ejection path may begin proximate to an input of the impeller, at which point snow is imparted with momentum at an output of the impeller to be pushed toward the discharge chute 50.

In an example embodiment, the snow removal device 10 may further include a control panel 60, which may include ignition controls, operating levers 62 and/or other controls or informational gauges. The control panel 60 may be provided to be accessible from the rear of the powered device 10 by an operator standing or walking behind the snow removal device 10 (e.g., at an operator's station) and capable of pushing, steering or otherwise controlling movement of the snow removal device 10 using a handlebar assembly 70 or some other steering assembly. In some examples, various ones of the operating levers 62 may be employed to control various components of the mobility assembly and/or the working assembly 30. As such, for example, different ones of the operating levers 62 may be operably coupled to various components to enable remote operator control of the respective components. The operation of the auger and/or impeller, application of drive power to the wheels 40 and the implementation of a mechanical power reversing assembly as described below are just a few examples of some of components that can be controlled by an operator at the control panel 60.

Figure 2:
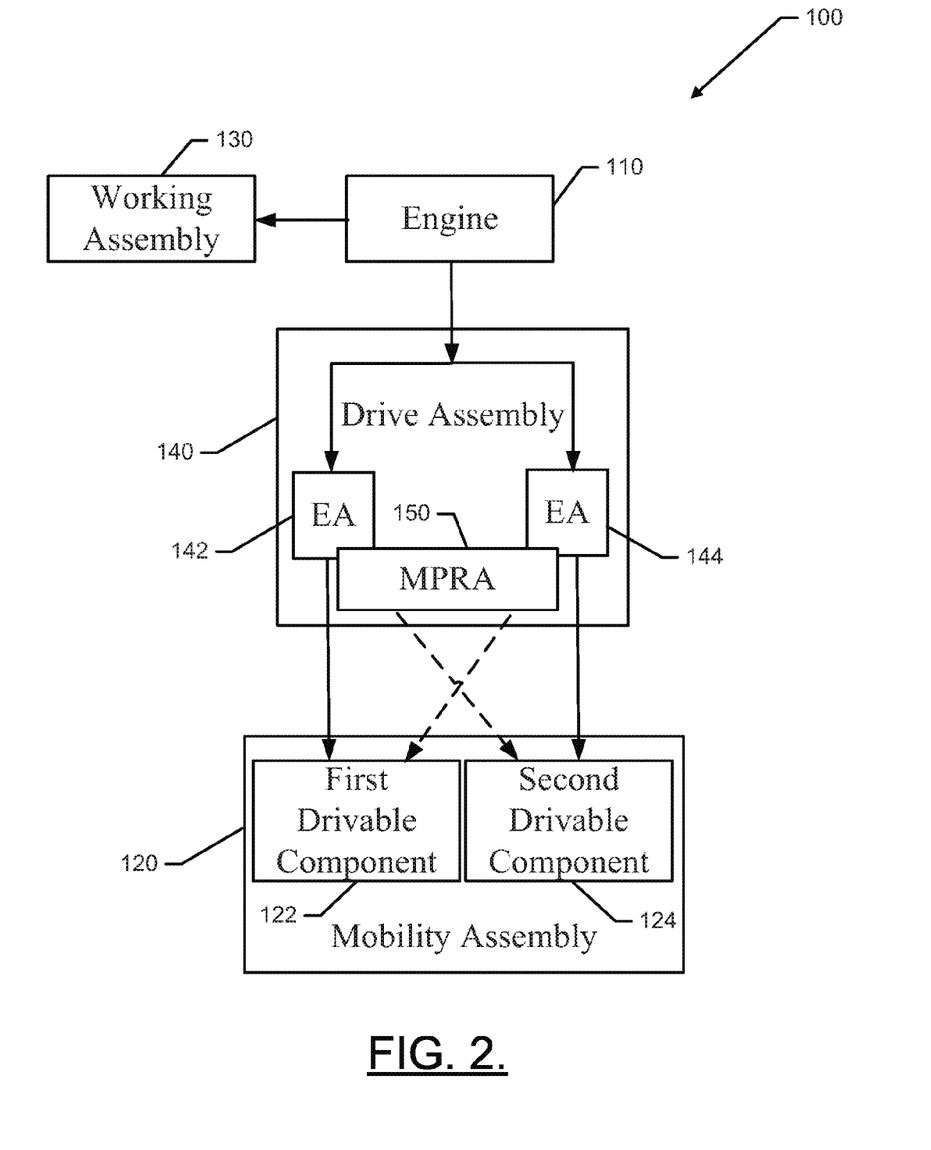
FIG. 2 illustrates a block diagram of a walk-behind, powered device according to an example embodiment.

Since, as indicated above, the snow removal device 10 of FIG. 1 is merely one example of a device on which example embodiments may be practiced, FIG. 2 is provided to facilitate a more general description of devices on which an example embodiment may be practiced. In this regard, FIG. 2 illustrates a block diagram of a powered device 100 in accordance with an example embodiment. It should be appreciated that the snow removal device 10 is one specific example of the powered device 100.

As shown in FIG. 2, the powered device 100 may include an engine 110 and a mobility assembly 120. The mobility assembly 120 may be operably coupled to the engine 110 to enable the powered device 100 to move over a ground surface upon which the powered device 100 is operable. Although the mobility assembly 120 may enable the operator to move the powered device 100 without power being applied to the mobility assembly 120 from the engine 110 (e.g., when the operator pushes the powered device 100), the engine 110 may at least be capable of providing power to the mobility assembly 110. The engine 20 described above is one example of the engine 110 of FIG. 2.

The mobility assembly 120 may include a first drivable component 122 and a second drivable component 124. The first and second drivable components 122 and 124 may be wheels (e.g., the wheels 40 of FIG. 1), continuous tracks, or any other suitable components that can be powered to cause the powered device 100 to move over the ground. In an example embodiment, the first and second drivable components 122 and 124 may be provided on a drive shaft that may include a bush/sleeve or other component to split the drive shaft so that each of the first and second drivable components 122 and 124 is independently drivable. As such, the first and second drivable components 122 and 124 may be provided on opposing sides of the powered device 100.

The powered device 100 may further include a working assembly 130 (an example of which is the working assembly 30 of FIG. 1). The working assembly 130 may be operably coupled to the engine 110 to perform a working function responsive at least in part to operation of the engine 110. As mentioned above, the working assembly 130 could perform working functions such as snow removal, mowing, edging, tilling and/or the like.

In an example embodiment, the powered device 100 may further include a drive assembly 140 that may provide the operable coupling between the engine 110 and the mobility assembly 120. The drive assembly 140 may include a transmission, friction drive, and/or other components configured for transferring power from the engine 110 to the mobility assembly 120. As such, the drive assembly 140 may selectively provide forward drive power or reverse drive power to the mobility assembly. In this regard, more specifically, the drive assembly 140 may transfer rotary power through a series of gears, frictionally engaged components, and/or the like to the first and second drivable components 122 and 124 to turn the first and second drivable components in a desired direction (i.e., forward or reverse). In a first configuration, the drive assembly 140 may provide no power to either of the first and second drivable components 122 and 124 (so the operator can push the powered device 100), or provide power to both of the first and second drivable components 122 and 124, simultaneously in the same direction (i.e., forward or reverse). While it is also possible to provide power to only one of the first or second drivable components 122 and 124 while no power is provided to the other, some example embodiments may further provide the ability to provide power simultaneously to the first and second drivable components 122 and 124 in opposite directions. Providing power in this manner may enable a very tight turn capability (e.g., a zero or near zero degree turning radius). Accordingly, it should be appreciated that the drive assembly 140 is configured to selectively and independently provide power to the first and second drivable components 122 and 124.

In accordance with an example embodiment, the drive assembly 140 includes a mechanical power reversing assembly (MPRA) 150 that is configured to be employed for the zero (or near zero) turn capability described above. Accordingly, instead of separately providing forward power to the first drivable component 122 with one power source operating in a forward direction while providing reverse power to the second drivable component 124 with another power source operating in the reverse direction, the MPRA 150 can be employed selectively to convert forward drive power generated for the first drivable component 122 into reverse drive power provided to the second drivable component 124. Reverse drive power could also be converted in the same manner into forward drive power for the opposite side using the MPRA 150. Thus, a single drive power source can be employed and, only using mechanical components, the power being routed to drive one drivable component in a first direction can be coupled in the opposite direction to the other drivable component.

FIG. 2 illustrates how the MPRA 150 is employed to use a single drive power source to power the first and second drivable components 122 and 124 in opposite directions in accordance with an example embodiment. In this regard, the drive assembly 140 further includes a first engagement assembly (EA) 142 and a second EA 144 that are each capable of being in an engaged state or a disengaged state. When the first and second EAs 142 and 144 are both in their engaged states, the solid lines connecting the drive assembly 140 to the first and second drivable components 122 and 124 are active (or engaged) and power is driven through the drive assembly 140 to each of the first and second drivable components 122 and 124 in the same direction. However, for example, if the first EA 142 is disengaged, then the solid line connecting the first EA 142 to the first drivable component 122 is no longer active (or engaged). However, if the MPRA 150 is engaged, then the first drivable component 122 is driven as indicated by the dashed line connecting the MPRA 150 and the first drivable component 122 from the power otherwise being provided to the second drivable component 124. Similarly, if the second EA 144 is disengaged, then the solid line connecting the second EA 144 to the second drivable component 124 is no longer active (or engaged). However, if the MPRA 150 is engaged, then the second drivable component 124 is driven as indicated by the dashed line connecting the MPRA 150 and the second drivable component 124 from the power otherwise being provided to the first drivable component 122.

In some cases, the MPRA 150 may be a single structure that serves both the first and second drivable components 122 and 124 in a selective manner based on the engagement state of the corresponding EAs. However, in some embodiments, the MPRA 150 may be embodied as a separate structure for each respective one of the first and second drivable components 122 and 124, and the separate structures may each be engaged when the corresponding EA is disengaged. Thus, it should be appreciated that various components of FIG. 2, can be embodied in various different ways and with various different structures. FIGS. 3-9 illustrate some examples of certain component structures that may be employed to embody the powered device 100 of FIG. 2.

Figure 3:
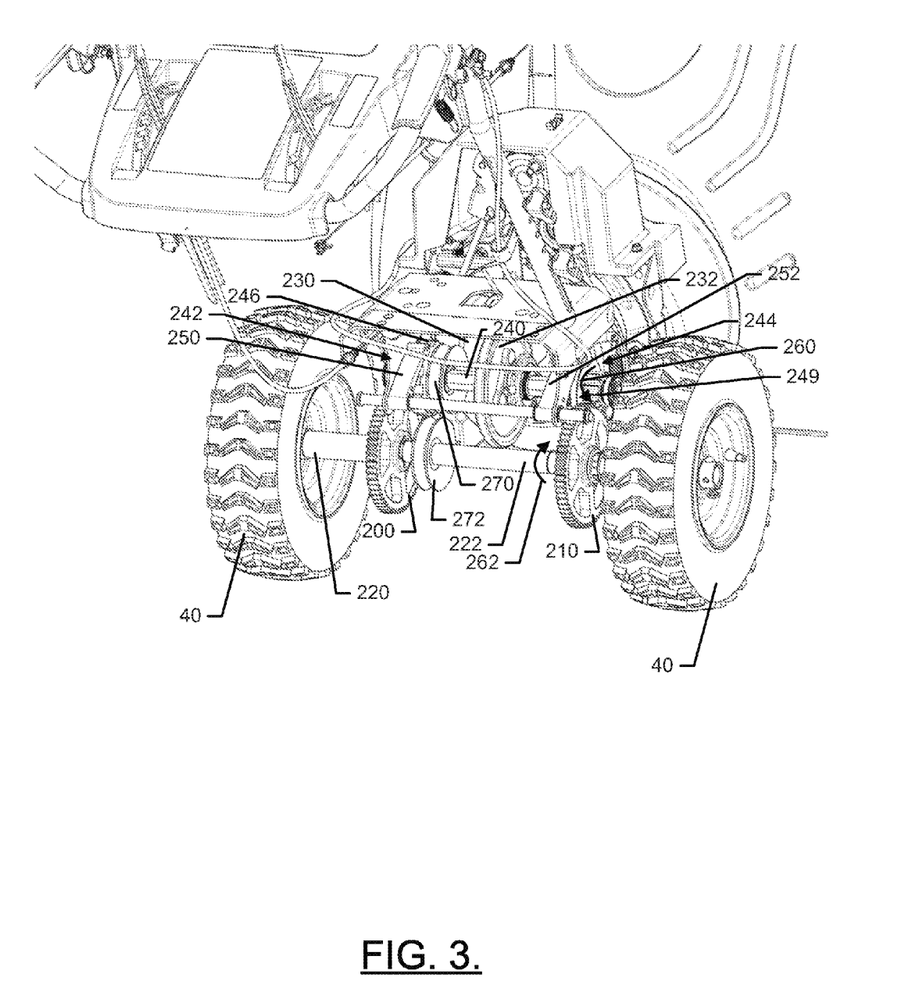
FIG. 3 illustrates an perspective view of components that may be used in cooperation with providing a mechanical power reversing assembly (MPRA) according to an example embodiment.

In this regard, FIG. 3 illustrates an example in which the MPRA 150 is embodied via a double pulley combination. As shown in FIG. 3, the wheels 40 (e.g., first and second drivable components 122 and 124) are driven via respective drive gears (e.g., first drive gear 200 and second drive gear 210) that are carried on a drive shaft 220. The drive shaft 220 may include a sleeve/bush 222 or other component that enables the respective drive gears to be independently powered. As such, the drive shaft 220 is functionally split at the sleeve/bush 222.

The drive assembly 140 may include a flywheel 230 that is powered by the engine 20. The flywheel 230 may frictionally engage a friction wheel 232 that is carried on a transmission shaft 240. When the friction wheel 232 engages the flywheel 230 away from the center of the flywheel 230, the friction wheel 232 may rotate and turn the transmission shaft 240. The first and second EAs 142 and 144 may be provided on the transmission shaft 240 on opposite ends thereof, and may be embodied as first and second transmission gear sets 242 and 244, respectively. The first and second transmission gear sets 242 and 244 may each include a ring gear (e.g., first ring gear 246 and second ring gear (not shown)) that each house a planetary gear inside. The planetary gear inside each of the first and second transmission gear sets 242 and 244 may be operably coupled to drive a corresponding spur gear that engages a respective one of the first and second drive gears 200 and 210. A first pawl 250 and a second pawl 252 interface with the first and second transmission gear sets 242 and 244 to selectively engage or disengage the first and second transmission gear sets 242 and 244 (and thereby engage or disengage their respective EAs as described above in reference to FIG. 2). When the first pawl 250 and second pawl 252 engage the first ring gear 246 and second ring gear, respectively, the first and second transmission gear sets 242 and 244 are each in an engaged state. In the engaged state, the first ring gear 246 and the second ring gear are held so that torque is driven through the planetary gears inside to the respective spur gears that engage the first and second drive gears 200 and 210.

Only second spur gear 249 is visible in FIG. 3. However, it can be appreciated that when the transmission shaft 240 is turning (e.g., in the forward power direction), if the second pawl 252 is engaged, then the second ring gear is held to drive torque through the planetary gear inside the second ring gear to the second spur gear 249, turning the second spur gear 249 in the direction shown by arrow 260. The second spur gear 249 then drives the second drive gear 210 in the direction shown by arrow 262 and the corresponding wheel 40 is turned in the forward direction.

If the first transmission gear set 242 is disengaged, then the first pawl 250 releases the first ring gear 246 so that the first ring gear 246 turns with the transmission shaft 240 and no torque is driven through the planetary gear inside the first transmission gear set 242 to the first spur gear (not shown). Thus, no drive power is transferred to the first drive gear 200. The corresponding wheel 40 may therefore not be driven (although it may still turn responsive to other forces).

In some embodiments, one of the operating levers 62 (see FIG. 1) and/or a trigger that may be provided with the operating levers 62 may be operated to disengage the first transmission gear set 242 (e.g., by pressing the operating lever 62 or trigger a predetermined amount). Further pressing of the operating lever 62 or trigger may engage the MPRA 150, which is embodied in this example as a double pulley arrangement. As will be discussed below, engaging (or actuating or activating) the MPRA 150 may cause the wheel 40 corresponding to the first drive gear 200 to be driven in the opposite direction to the direction shown by arrow 262. In some embodiments, the amount of torque provided via the MPRA 150 may be modulated based on how far the operating lever 62 or trigger is pressed. Thus, as will be seen below, belt tension, braking force, and/or the like, may be modulated based on operating lever 62 or trigger position to change the amount of reverse drive power delivered. The operating lever 62 and trigger may each be examples of an operating member that may generally be used to provide the control described above when actuated or operated by the user.

As such, in this example, a first pulley 270 may be carried on the transmission shaft 240 and a second pulley 272 may be carried on the drive shaft 220 on the same side of the sleeve/bush 222 as the first drive gear 200. Thus, while no torque is transmitted to the first drive gear via the first transmission gear set 242 (due to the first pawl 250 being disengaged), the first pulley 270 may turn in the direction show by arrow 260 while being driven by the transmission shaft 240. Meanwhile, a belt (not shown) operably coupling the first pulley 270 and the second pulley 272 may be tensioned to turn the second pulley 272 in the direction of arrow 260 and also turn the drive shaft 220 on the side of the sleeve/bush 222 on which the first gear 200 is carried in the direction of arrow 260 as well. Thus, the drive shaft 220 on opposite sides of the sleeve/bush 222 will be turning in opposite directions and the wheels 40 will therefore be powered in opposite directions. A zero degree or otherwise short radius turn may therefore be accomplished. It should be appreciated that, although not shown in FIG. 3, a corresponding double pulley set may also be provided to drive the other wheel in a similar fashion to that which has been described above.

In some embodiments, a belt tensioner may be actuated with the disengagement of the first pawl 250. The belt tensioner could be provided on or in engagement with the first pawl 250 such that when the first pawl 250 rotates out of engagement with the first ring gear 246, the belt tensioner engages the belt and provides tension to transmit rotational force from the first pulley 270 to the second pulley 272. The first pulley 270 may be appreciated as always turning with the transmission shaft 240. However, the second pulley 272 may only be powered when the first pawl 250 is disengaged and the belt is tensioned by the belt tensioner. Thus, the belt tensioner of this example may be the mechanism by which the MPRA 150 is engaged.

Figure 4:
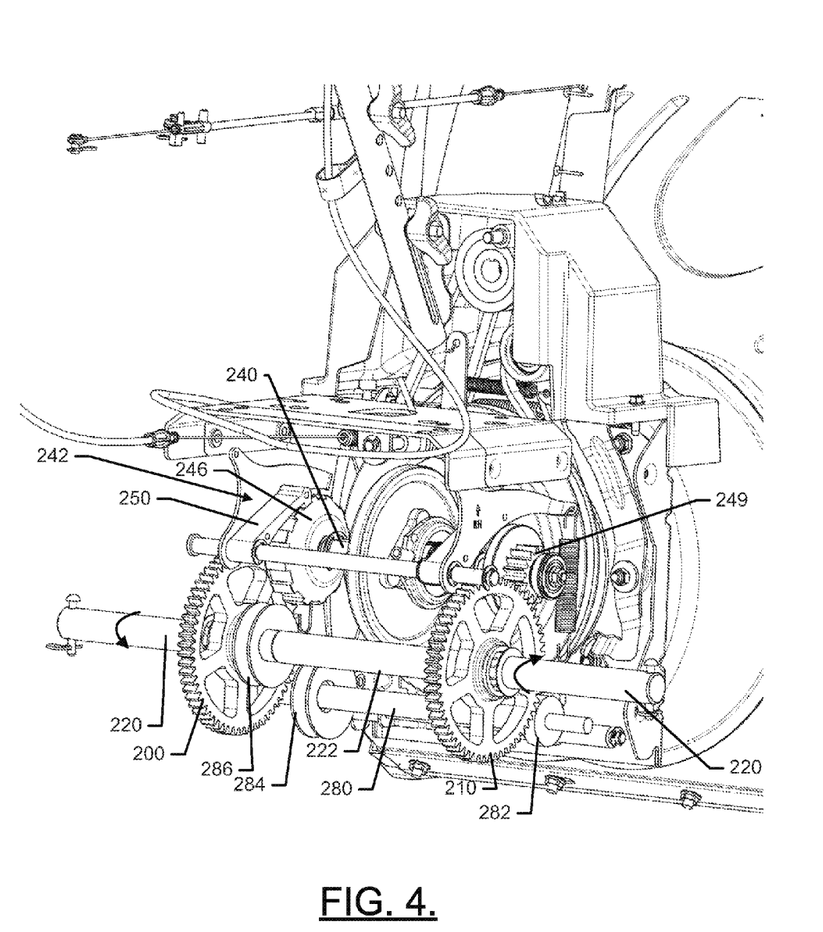
FIG. 4 illustrates a perspective view of an alternate structure for employing the MPRA according to an example embodiment.

As mentioned above, other example structures may also be implemented to embody the MPRA 150. FIG. 4 illustrates a perspective view of an alternate structure that employs a single pulley on an intermediate shaft for each respective drive gear. In this regard, as shown in FIG. 4 (which only shows the MPRA 150 for one side, but could be duplicated for the other), an intermediate shaft 280 is provided with a first driven gear 282. The first driven gear 282 is carried at an end of the intermediate shaft 280 that corresponds with the second drive gear 210, and the first driven gear 282 engages and is driven by the second drive gear 210 to turn the intermediate shaft 280 in a direction opposite the direction in which the second drive gear 210 turns. The transmission shaft 240 and first and second transmission gear sets 242 and 244 are operated as described above. Meanwhile, the intermediate shaft 280 carries a first driven pulley 284 proximate to an opposite end thereof. The first driven pulley 284 engages a second driven pulley 286 carried on the drive shaft 220 as described above in the example of FIG. 3. As described above, when the first pawl 250 is disengages, a belt tensioner may operate to tension the belt that operably couples the first driven pulley 284 and the second driven pulley 286 to couple the rotation of the intermediate shaft 280 (in the direction opposite the direction of rotation of the second drive gear 210) to the side of the drive shaft 220 on which the first drive gear 200 is provided. Again, the result is that when the first transmission gear set 242 is disengaged, the belt is tensioned and the wheel on the side of the first drive gear 200 (although the first drive gear 200 itself is not powered via the first spur gear) is turned in the opposite direction to the direction that the wheel on the side of the second drive gear 210 is turning. Moreover, the power provided to turn the second drive gear 210 in a first direction is reversed (via the intermediate shaft 280 and the first and second driven pulleys 284 and 286) to turn the wheel corresponding to the first drive gear 200 in the opposite direction.

Figure 5:
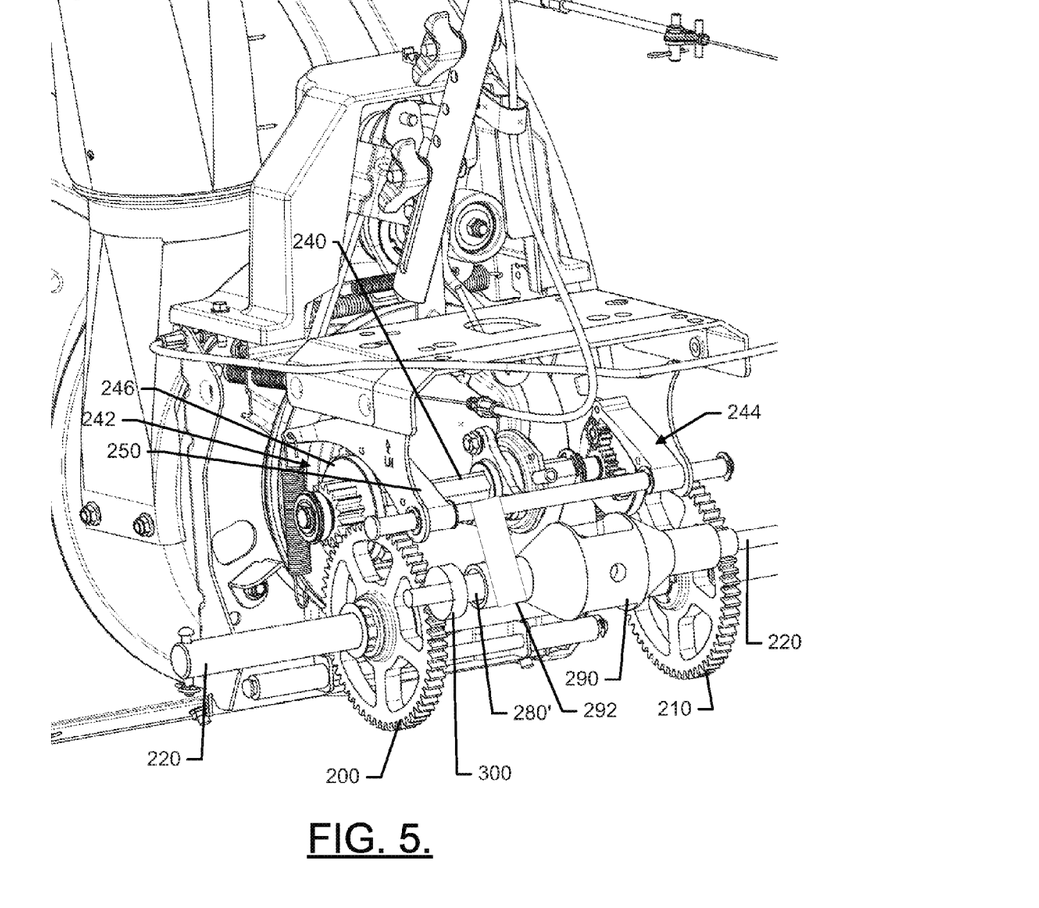
FIG. 5 illustrates a perspective view of still another alternate structure for employing the MPRA according to an example embodiment.

FIG. 5 illustrates a perspective view of yet another example structure for embodying the MPRA 150. In FIG. 5, the MPRA 150 is embodied as an intermediate shaft 280' carrying a remote differential 290. The intermediate shaft 280' may include first and second drive engagement gears 300 and 302 proximate to each opposing end to engage the first and second drive gears 200 and 210, respectively. The transmission shaft 240 and the first and second transmission gear sets 242 and 244 operate as described above. Thus, during normal operation, the transmission shaft 240 drives both the first and second drive gears 200 and 210 in the same direction through engagement of the first and second transmission gear sets 242 and 244 as described above. Meanwhile, the intermediate shaft 280' is driven to rotate in the opposite direction to the direction that the drive shaft 220 is driven in via the engagement with the first and second drive gears 200 and 210. However, in this example, when the first transmission gear set 242 is disengaged (e.g., by first pawl 250 disengaging from first ring gear 246), the rotation of the first pawl 250 may engage a band brake 292 to apply a braking force to the remote differential 290. The braking of the remote differential 290 activates the remote differential 290 and causes torque to be transmitted through the remote differential 290 to drive the disengaged side (i.e., the first drive gear 200 in this case) in the opposing direction to the engaged side by reversing the power provided to the engaged side.

Figure 6:
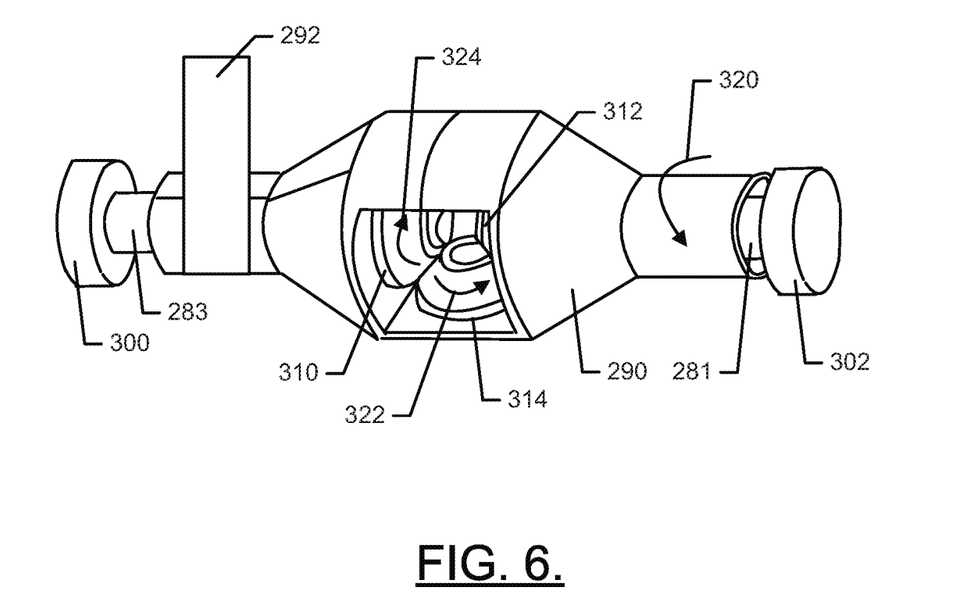
FIG. 6 is a perspective view of a differential used in the MPRA of FIG. 5 according to an example embodiment.

FIG. 6 illustrates the remote differential in greater detail to facilitate further explanation of this process. As shown in FIG. 6, the remote differential includes a left bevel gear 310, a right bevel gear 312, and a bottom bevel gear 314. A top bevel gear may also be included, but is not shown. The bevel gears are all provided with perpendicular axes relative to their adjacent bevel gears. The intermediate shaft 280' is split into a right side 281 and a left side 283. The right side 281 is connected to the right bevel gear 312, and the left side 283 is connected to the left bevel gear 310. When the intermediate shaft 280' is driven at both the first drive engagement gear 300 and the second drive engagement gear 302 in the same direction (e.g., the direction of arrow 320), the right and left bevel gears 312 and 310 each turn in the same direction as well, and the remote differential 290 is carried and turns in the same direction as well so that no torque is transmitted through the remote differential 290. However, if the band brake 292 is applied when the right side is engaged and the left side is disengaged, then the right side 281 will turn in the direction of arrow 320 (responsive to driving of the second drive engagement gear 302), and the remote differential 290 will be held stationary so that the rotation of the right bevel gear 312 in the direction of arrow 320 will cause the bottom bevel gear 314 to rotate in the direction of arrow 322. The rotation of the bottom bevel gear 314 will further cause the left bevel gear 310 to rotate in the direction of arrow 324, which further causes the first drive engagement gear 300 to turn in the direction of arrow 324, which is the opposite direction to that of arrow 320. The first drive engagement gear 300 may then turn the first drive gear 200 in the opposite direction to that which the second drive gear 210 is turning, but the source of power for moving the first drive gear 200 is the same as the source of power for turning the second drive gear 210. Accordingly, the remote differential 290 selectively reverses the power provided to one drive gear so that it powers the other drive gear in the opposite direction in response to disengaging the other drive gear and engaging the remote differential.

Figure 7:
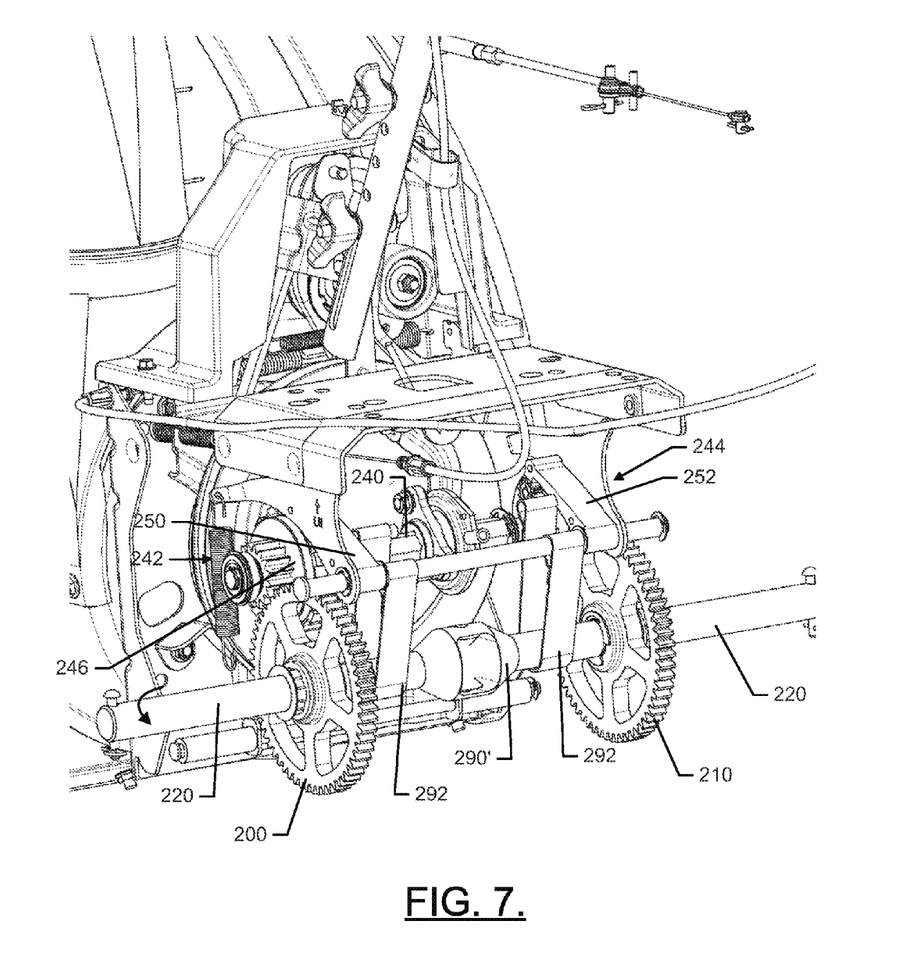
FIG. 7 illustrates a perspective view of yet another alternate structure for employing the MPRA according to an example embodiment.

FIG. 7 illustrates another embodiment that is similar to the example of FIGS. 5 and 6 except that the differential 290' is not remotely located on an intermediate shaft, but is instead provided on the drive shaft 220. Thus, operation of the example of FIG. 7 is similar to that described above for FIGS. 5 and 6 except that the first and second drive engagement gears are essentially replaced by the first and second drive gears 200 and 210, respectively. For the example of FIG. 7, when the second pawl 252 is engaged, and the first pawl 250 is disengaged, power is transferred from the transmission shaft 240 to the second drive gear 210 via the second transmission gear set 244 as described above. However, since the second transmission gear set 242 is disengaged, there is no power transferred to the first drive gear 200 via the first transmission gear set 242. Instead, if the band brake 292 is applied when the first pawl 250 is disengaged, then the differential 290' is held stationary and the turning of the second drive gear 210 causes turning of the first drive gear 200 in the opposing direction via similar operations to those described above in relation to FIG. 6.

Figure 8:
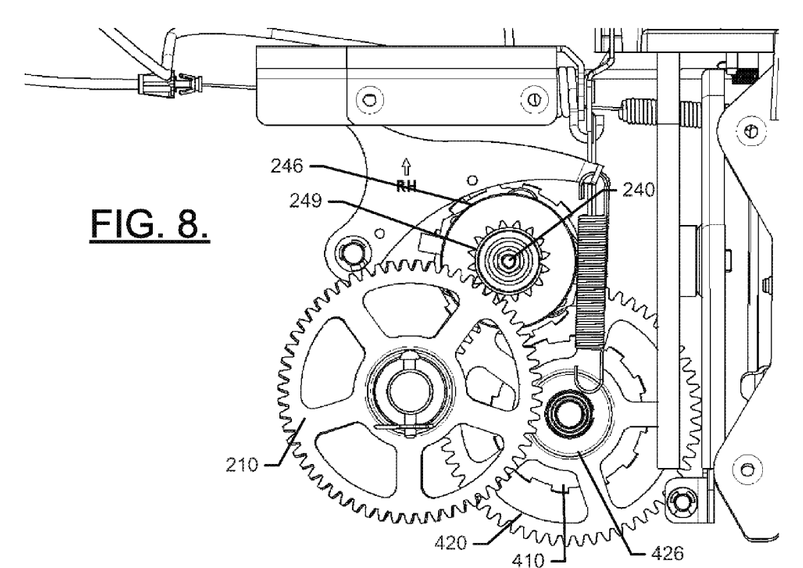
FIG. 8 illustrates a side view of another alternative structure for providing the MPRA of FIG. 2 according to an example embodiment.
Figure 9:
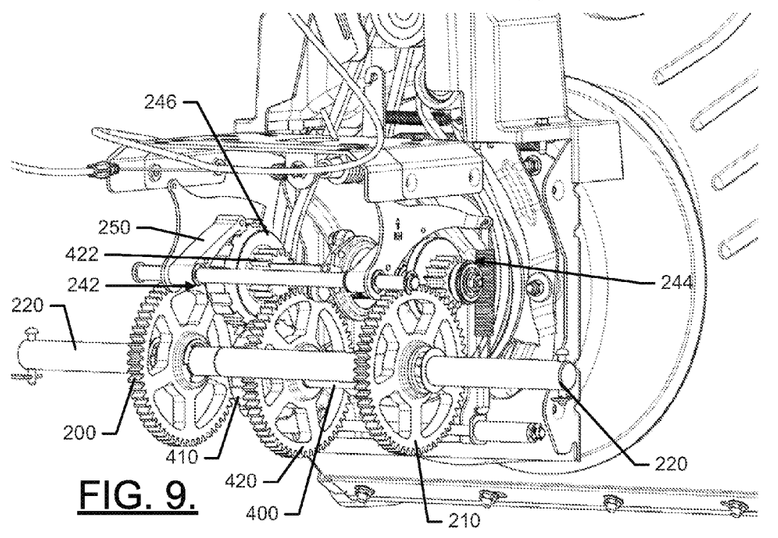
FIG. 9 illustrates a perspective view of the alternative structure of FIG. 8 according to an example embodiment.

FIG. 8 illustrates a side view of another alternative structure for providing the MPRA 150 of FIG. 2. FIG. 9 illustrates a perspective view of the alternative structure of FIG. 8. In the example embodiment of FIGS. 8 and 9, the transmission shaft 240 and the first and second transmission gear sets 242 and 244 operate as described above to provide power to the first and second drive gears 200 and 210, respectively, when the first and second transmission gear sets 242 and 244 are engaged. However, when one of the transmission gear sets is disengaged, the engaged side powers the disengaged side to turn the corresponding drive gear in the opposite direction to the direction that the engaged side drive gear turns.

The structure of the MPRA 150 of FIG. 2 in accordance with this example embodiment may include an intermediate shaft 400 that is provided with a planetary gear set 410 that includes a ring gear and an inner planetary gear coupled to the intermediate shaft 400. The intermediate shaft 400 also carries a first coupling gear 420 that engages a second coupling gear 422 carried on the transmission shaft 240 proximate to the first transmission gear set 242. A third coupling gear 426 is also carried by the intermediate shaft 400 proximate to the first coupling gear 420.

When the first pawl 250 is disengaged from the first ring gear 246 of the first transmission gear set 242, the transmission of power to the first drive gear 200 via the first transmission gear set 242 is stopped, as described above. However, disengagement of the first transmission gear set 242 may be configured to engage the ring gear of the planetary gear set 410. The first coupling gear 420 may be turned responsive to rotation of the transmission shaft 240 via the second coupling gear 422 to turn the intermediate shaft 400. However, the locking of the ring gear may cause the rotation of the intermediate shaft 400 to be translated through the inner planetary gear inside the planetary gear set 410 to the third coupling gear 426. The third coupling gear 426 may then transmit torque to the first drive gear 200 to turn the first drive gear 200 in the opposite direction to the direction in which the transmission shaft 240 is powering the second drive gear 210 to turn. The structure described above may be duplicated on each side of the powered device 100. Accordingly, again, the MPRA 150 uses power from the engaged side to turn the disengaged side in a direction opposite that of the engaged side.

Thus, a walk-behind, powered device in accordance with an example embodiment may include an engine, a mobility assembly operably coupled to the engine to provide mobility of the powered device responsive at least in part to operation of the engine, a working assembly operably coupled to the engine to perform a working function responsive at least in part to operation of the engine, and a drive assembly operably coupling the engine to the mobility assembly to selectively provide first drive power in a first direction to the mobility assembly or second drive power in a second direction opposite the first direction to the mobility assembly. The mobility assembly includes a first drivable component and a second drivable component. The first and second drivable components may be disposed substantially at opposing sides of the powered device. The drive assembly is configured to selectively and independently provide power to the first and second drivable components. The drive assembly includes a mechanical power reversing assembly that is selectively engagable to convert the first drive power generated for the first drivable component into the second drive power provided to the second drivable component.

The powered device (or drive assembly) of some embodiments may include additional features that may be optionally added either alone or in combination with each other. For example, in some embodiments, (1) the drive assembly may include a transmission shaft operably coupled to a drive shaft of the mobility assembly. The drive shaft may independently power the first and second drivable components. The transmission shaft may carry a first transmission gear set and second transmission gear set, each of which is operably coupled to respective ones of the first and second drivable components via respective first and second drive gears carried on the drive shaft. The first and second transmission gear sets may be configured to transmit the first drive power to the respective first and second drive gears in response to the first and second transmission gear sets being in an engaged state. In response to the second transmission gear set being in a disengaged state, the mechanical power reversing assembly may apply the second drive power to the second drivable component responsive to application of the first drive power to the transmission shaft. In an example embodiment, (2) the first and second transmission gear sets may each be selectively transferable between the engaged and disengaged states based on engagement of a respective first pawl and second pawl with a corresponding first ring gear and second ring gear of the first and second transmission gear sets, respectively. In some cases, (3) the first drive power may be transferred from the transmission shaft through a first planetary gear inside the first ring gear to a first spur gear operably coupled to the first drive gear to drive the first drivable component in a forward direction responsive to engagement of the first pawl with the first ring gear. The second drive power may be transferred from the transmission shaft to the second drivable component via the mechanical power reversing assembly.

In some embodiments, any or all of the modifications of (1) to (3) may be employed and the mechanical power reversing assembly may include a first pulley driven by the transmission shaft and a second pulley carried on the drive shaft, where the first and second pulleys are operably coupled to provide the second drive power to the drive shaft. In some cases, any or all of the modifications of (1) to (3) may be employed and an intermediate shaft extending parallel to the drive shaft and the transmission shaft may also be provided. The intermediate shaft may be driven by engagement with the first drive gear. The mechanical power reversing assembly may include a first pulley driven by the transmission shaft and a second pulley carried on the drive shaft, where the first and second pulleys are operably coupled to provide the second drive power to the drive shaft. In such an example, a belt may provide the operable coupling between the first and second pulleys, and the belt may be tensioned in response to the second transmission gear set being in the disengaged state. In some embodiments, any or all of the modifications of (1) to (3) may be employed and an intermediate shaft extending parallel to the drive shaft and the transmission shaft may be provided. The intermediate shaft engages each of the first and second drive gears, and the mechanical power reversing assembly includes a remote differential gear assembly disposed on the intermediate shaft, the remote differential gear assembly selectively transmitting the second drive power to the second drive gear in response to the second transmission gear set being in the disengaged state, and applying a brake force to the remote differential gear assembly. In some examples, any or all of the modifications of (1) to (3) may be employed and the mechanical power reversing assembly may include a differential gear assembly disposed on the drive shaft. The differential gear assembly may selectively transmit the second drive power to the second drive gear in response to the second transmission gear set being in the disengaged state, and applying a brake force to the differential gear assembly. In an example embodiment, any or all of the modifications of (1) to (3) may be employed and an intermediate shaft extending parallel to the drive shaft and the transmission shaft may be provided. The intermediate shaft may be driven by engagement with the first transmission gear set. The mechanical power reversing assembly may include a planetary gear provided on the intermediate shaft, the planetary gear engaging the second drive gear to drive the second drive gear in a direction opposite the direction of the first drive gear responsive to the second transmission gear set being in the disengaged state. Additionally or alternatively, the first and second drivable components may be first and second wheels, respectively. Additionally or alternatively, the powered device may be a snow removal device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although That which is claimed:

1. A walk-behind, powered device comprising:
an engine;
a mobility assembly operably coupled to the engine to provide mobility of the powered device responsive at least in part to operation of the engine;
a working assembly operably coupled to the engine to perform a working function responsive at least in part to operation of the engine; and
a drive assembly operably coupling the engine to the mobility assembly to selectively provide a first drive power in a first direction to the mobility assembly, or a second drive power in a second direction opposite the first direction to the mobility assembly,
wherein the mobility assembly comprises a first drivable component and a second drivable component, the first and second drivable components being disposed substantially at opposing sides of the powered device,
wherein the drive assembly is configured to selectively and independently provide power to the first and second drivable components, and
wherein the drive assembly comprises a mechanical power reversing assembly, the mechanical power reversing assembly being selectively engagable to convert the first drive power generated for the first drivable component into the second drive power provided to the second drivable component,
wherein the drive assembly comprises a transmission shaft operably coupled to a drive shaft of the mobility assembly, the drive shaft independently powering the first and second drivable components,
wherein the transmission shaft carries a first transmission gear set and a second transmission gear set, each of which is operably coupled to respective ones of the first and second drivable components via respective first and second drive gears carried on the drive shaft,
wherein the first and second transmission gear sets are configured to transmit the first drive power to the respective first and second drive gears in response to the first and second transmission gear sets being in an engaged state, and
wherein, in response to the second transmission gear set being in a disengaged state, the mechanical power reversing assembly applies the second drive power to the second drivable component responsive to application of the first drive power to the transmission shaft.

2. The powered device of claim 1, wherein the first and second transmission gear sets are each selectively transferable between the engaged and disengaged states based on engagement of a respective first pawl and second pawl with a corresponding first ring gear and second ring gear of the first and second transmission gear sets, respectively.

3. The powered device of claim 2, wherein the first drive power is transferred from the transmission shaft through a first planetary gear inside the first ring gear to a first spur gear operably coupled to the first drive gear to drive the first drivable component in the first direction responsive to engagement of the first pawl with the first ring gear, and wherein the second drive power is transferred from the transmission shaft to the second drivable component via the mechanical power reversing assembly.

4. The powered device of claim 1, wherein the mechanical power reversing assembly comprises a first pulley driven by the transmission shaft and a second pulley carried on the drive shaft, the first and second pulleys being operably coupled to provide the second drive power to the drive shaft.

5. The powered device of claim 1, further comprising an intermediate shaft extending parallel to the drive shaft and the transmission shaft,
wherein the intermediate shaft is driven by engagement with the first drive gear, and
wherein the mechanical power reversing assembly comprises a first pulley driven by the intermediate shaft and a second pulley carried on the drive shaft, the first and second pulleys being operably coupled to provide the second drive power to the drive shaft.

6. The powered device of claim 5, wherein a belt provides the operable coupling between the first and second pulleys, and wherein the belt is tensioned in response to the second transmission gear set being in the disengaged state.

7. The powered device of claim 1, further comprising an intermediate shaft extending parallel to the drive shaft and the transmission shaft,
wherein the intermediate shaft engages each of the first and second drive gears, and
wherein the mechanical power reversing assembly comprises a remote differential gear assembly disposed on the intermediate shaft, the remote differential gear assembly selectively transmitting the second drive power to the second drive gear in response to:
the second transmission gear set being in the disengaged state, and
applying a brake force to the remote differential gear assembly.

8. The powered device of claim 1, wherein the mechanical power reversing assembly comprises a differential gear assembly disposed on the drive shaft, the differential gear assembly selectively transmitting the second drive power to the second drive gear in response to:
the second transmission gear set being in the disengaged state, and
applying a brake force to the differential gear assembly.

9. The powered device of claim 1, further comprising an intermediate shaft extending parallel to the drive shaft and the transmission shaft, wherein the intermediate shaft is driven by engagement with the first transmission gear set, wherein the mechanical power reversing assembly comprises a planetary gear provided on the intermediate shaft, the planetary gear engaging the second drive gear to drive the second drive gear in a direction opposite the direction of the first drive gear responsive to the second transmission gear set being in the disengaged state.

10. The powered device of claim 1, wherein the first and second drivable components comprise first and second wheels, respectively.

11. The powered device of claim 1, wherein the powered device comprises a snow removal device.

12. A drive assembly for a walk-behind, powered device, the drive assembly operably coupling an engine of the powered device to a mobility assembly to provide mobility of the powered device responsive at least in part to operation of the engine, the drive assembly comprising:
a transmission shaft selectively receiving first drive power in a first direction or second drive power in a direction opposite the first direction, the first or second drive power being coupled from the engine to drive a first drivable component and a second drivable component of the mobility assembly, the first and second drivable components being disposed substantially at opposing sides of the powered device; and a mechanical power reversing assembly, the mechanical power reversing assembly being selectively engagable to convert the first drive power generated for the first drivable component into the second drive power provided to the second drivable component, wherein the transmission shaft is operably coupled to a drive shaft of the mobility assembly, the drive shaft independently powering the first and second drivable components, wherein the transmission shaft carries a first transmission gear set and a second transmission gear set, each of which is operably coupled to respective ones of the first and second drivable components via respective first and second drive gears carried on the drive shaft, wherein the first and second transmission gear sets are configured to transmit the first drive power to the respective first and second drive gears in response to the first and second transmission gear sets being in an engaged state, and wherein, in response to the second transmission gear set being in a disengaged state, the mechanical power reversing assembly applies the second drive power to the second drivable component responsive to application of the first drive power to the transmission shaft.

13. The drive assembly of claim 12, wherein the first and second transmission gear sets are each selectively transferable between the engaged and disengaged states based on engagement of a respective first pawl and second pawl with a corresponding first ring gear and second ring gear of the first and second transmission gear sets, respectively.

14. The drive assembly of claim 13, wherein the first drive power is transferred from the transmission shaft through a first planetary gear inside the first ring gear to a first spur gear operably coupled to the first drive gear to drive the first drivable component in the first direction responsive to engagement of the first pawl with the first ring gear, and wherein the second drive power is transferred from the transmission shaft to the second drivable component via the mechanical power reversing assembly.

15. The drive assembly of claim 12, wherein the mechanical power reversing assembly comprises a first pulley driven by the transmission shaft and a second pulley carried on the drive shaft, the first and second pulleys being operably coupled to provide the second drive power to the drive shaft.

16. The drive assembly of claim 12, further comprising an intermediate shaft extending parallel to the drive shaft and the transmission shaft, wherein the intermediate shaft is driven by engagement with the first drive gear, and wherein the mechanical power reversing assembly comprises a first pulley driven by the intermediate shaft and a second pulley carried on the drive shaft, the first and second pulleys being operably coupled to provide the second drive power to the drive shaft.

17. The drive assembly of claim 12, wherein the mechanical power reversing assembly comprises a differential gear assembly disposed on the drive shaft, the differential gear assembly selectively transmitting the second drive power to the second drive gear in response to:

the second transmission gear set being in the disengaged state, and applying a brake force to the differential gear assembly.

18. The drive assembly of claim 12, further comprising an intermediate shaft extending parallel to the drive shaft and the transmission shaft, wherein the intermediate shaft is driven by engagement with the first transmission gear set, wherein the mechanical power reversing assembly comprises a planetary gear provided on the intermediate shaft, the planetary gear engaging the second drive gear to drive the second drive gear in a direction opposite the direction of the first drive gear responsive to the second transmission gear set being in the disengaged state.

* * * * *